United States Patent
Yanagihara

(10) Patent No.: US 7,924,856 B2
(45) Date of Patent: Apr. 12, 2011

(54) TREE-SHAPED BROADCASTING SYSTEM, PACKET TRANSMITTING METHOD, NODE DEVICE, AND COMPUTER-READABLE MEDIUM

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 211 days.

(21) Appl. No.: 12/453,054

(22) Filed: Apr. 28, 2009

(65) Prior Publication Data
US 2009/0274160 A1 Nov. 5, 2009

(30) Foreign Application Priority Data
Apr. 30, 2008 (JP) .................... 2008-119037

(51) Int. Cl.
*H04L 12/56* (2006.01)
(52) U.S. Cl. ...................... 370/408; 709/222
(58) Field of Classification Search .............. 370/338, 370/235, 229, 223, 232, 248, 400, 260, 221; 709/222
See application file for complete search history.

(56) References Cited

U.S. PATENT DOCUMENTS

| | | | | |
|---|---|---|---|---|
| 5,909,431 A * | 6/1999 | Kuthyar et al. | ............... | 370/260 |
| 6,240,083 B1 * | 5/2001 | Wright et al. | .................. | 370/348 |
| 6,850,511 B2 * | 2/2005 | Kats et al. | ..................... | 370/338 |
| 6,999,459 B1 * | 2/2006 | Callon et al. | .................. | 370/400 |
| 7,349,330 B1 * | 3/2008 | Hayakawa et al. | ........... | 370/229 |
| 7,428,211 B2 * | 9/2008 | Yu | .................. | 370/223 |
| 7,742,415 B1 * | 6/2010 | Dave | ............................ | 370/231 |
| 2003/0033394 A1 * | 2/2003 | Stine | ........................... | 709/222 |
| 2005/0047327 A1 * | 3/2005 | Saleh et al. | .................... | 370/221 |
| 2005/0207342 A1 * | 9/2005 | Tanabe et al. | ................. | 370/235 |
| 2007/0133587 A1 | 6/2007 | Hibino et al. | | |
| 2010/0189086 A1 * | 7/2010 | Kats et al. | ..................... | 370/338 |

FOREIGN PATENT DOCUMENTS
JP       A-2006-33514       2/2006
* cited by examiner

*Primary Examiner* — Thong H Vu
(74) *Attorney, Agent, or Firm* — Oliff & Berridge, PLC

(57) ABSTRACT

A lost packet in a plurality of packets broadcasted from a broadcasting apparatus is detected. Packet complement request information indicative of a packet complement request for complementing the lost packet is transmitted to a device in a high hierarchical level, and a dummy packet for holding transmission of the packet complement request information for a predetermined hold time is transmitted in place of the lost packet to a node device connected in a low hierarchical level.

7 Claims, 13 Drawing Sheets

TREE-SHAPED BROADCASTING SYSTEM, PACKET TRANSMITTING METHOD, NODE DEVICE, AND COMPUTER-READABLE MEDIUM

The entire disclosure of the Japanese Patent Application No. 2008-119037, including the specification, the scope of claims, drawings, and abstract, filed on Apr. 30, 2008 is incorporated herein by reference in its entirety.

BACKGROUND OF THE INVENTION

1. Field of the Invention

The present invention relates to a peer-to-peer (P2P) communication system having a plurality of node devices which can communicate with each other via a network.

2. Discussion of the Related Art

A technique called "Application Layer Multicast (ALM)" is known, which relays and distributes a content data stream while maintaining a content data distribution (broadcast) path in an application layer. For example, in a tree-shaped broadcasting system disclosed in Japanese Unexamined Patent Application Publication No. 2006-33514, a plurality of node devices participating in the system are connected in a tree shape via a network while forming a plurality of hierarchical levels with a broadcast station (for example, a broadcast apparatus) as a root at the highest level, and content data broadcasted from the broadcast station is sequentially transferred (relayed) from a node device in a high hierarchical level to a node device in a low hierarchical level. With such a technique, each of the node devices copies a plurality of packets of content data a predetermined number of times in an application layer. Each node device sends the copied packets to a node device one level lower in the hierarchy, receives the packets from a node one level higher in the hierarchy and relays the packets to a node one level lower in the hierarchy. The number of times to copy the packets at a node device equals the number of node devices that are one level lower in the hierarchy connected to it. Thus, in the tree-shaped broadcasting system that distributes contents from the broadcast station to node devices connected to the broadcast station in low hierarchical levels, the contents can be multi-casted to the node devices with the smaller number of relay levels.

In such a technique, terminal devices of the users are used as relay node devices. Consequently, even if the quality of an access line to which the terminal devices are connected is stable, a packet to be relayed depending on the network use situations of the terminal devices tends to be lost between the terminal devices. An ALM program is implemented so as to immediately relay a packet received from a node device to node devices that are one level lower in the hierarchy. If a packet is lost in a node device, the lost packet is immediately propagated toward the node devices that are one level lower in hierarchy.

Usually, a terminal device having an ALM program installed, receives a packet from a terminal device one level higher in the hierarchy and stores the packet into a buffer memory such as a ring buffer. By checking continuity of sequence numbers of packets at this time, a node device where a packet loss event occurs can be found. For a packet whose loss is detected, a packet complement request is sent to a node device at one level higher than the node where the packet loss is detected in the hierarchy. The packet complement request means that a node device which finds a packet loss event asks the other node device at one level higher in the hierarchy whether a complementary packet is stored. The node device in the immediate higher hierarchical level determines whether a complementary packet is stored in its buffer memory. When the complementary packet is stored, the node device transmits the complementary packet to the node device sending the packet complement request. When the complementary packet is not stored in buffer memory, the node device transfers the packet complement request to a node device at one level higher than itself in the hierarchy.

SUMMARY OF THE INVENTION

However, in technique of ALM, a packet loss event is immediately propagated toward the lowest hierarchical level. If a packet loss event occurs near the root (at the highest hierarchical level) of the topology, a node device near the root receives packet complement requests from all of node devices positioned in the lower hierarchical levels in short time. The number of node devices positioned in the lower hierarchical levels may be in the order of hundreds or thousands. At this level, a problem occurs that the network is overloaded due to excessive reception of packet complement requests.

In view of the above problems and the like, therefore, it is an object of the present invention to provide a tree-shaped broadcast system, a packet transmitting method, a node device, and a recording medium in which a node process program is recorded, capable of realizing avoidance of chain transmission of packet complement requests which occurs when a packet loss event is propagated toward the lowest hierarchical level, prevention of excessive traffic in a network, and avoidance of concentration of packet complement requests to a specific node device.

In order to solve the above problems, one aspect of the invention relates to a node device for use in a tree-shaped broadcasting system including a plurality of node devices connected and located in a hierarchy, the node device comprising:

a receiver configured to receive a plurality of packets of content data transmitted from a node located at one level higher in the hierarchy or a broadcasting device located at a top of the hierarchy;

a lost packet detector configured to detect a lost packet from the packets of the content data received by the receiver;

a packet complement request information transmitter configured to transmit packet complement request information to the node device located at one level higher in the hierarchy, the packet complement request information including a packet complementation request to complement the lost packet; and a dummy packet transmitter configured to transmit a dummy packet to a node located at one level lower in the hierarchy instead of the lost packet, the dummy packet including information to delay transmission of the packet complement request information for a predetermined period of hold time.

BRIEF DESCRIPTION OF THE DRAWINGS

Illustrative aspects will be described in detail with reference to the following figures in which like elements are labeled with like numbers and in which.

DETAILED DESCRIPTION

An illustrative embodiment will be described below with reference to the accompanying drawings.

1. Configuration of Tree-Shaped Broadcast System

First, with reference to FIG. 1, a general configuration and functions of a tree-shaped broadcast system S as an embodiment of the present invention will be described. The tree-shaped broadcasting system S is a peer-to-peer network system.

As shown in a lower frame in FIG. 1, the tree-shaped broadcast system S includes a plurality of node devices (hereinbelow, called "nodes") Nn (n=any number of 1, 2, 3, ... ). The nodes Nn are mutually connected through a network (a communication network in the real world) 8 such as the Internet. The network 8 is constructed by IXs (Internet exchanges) 3, ISPs (Internet Service Providers) 4a and 4b, (apparatuses of) DSL (Digital Subscriber Line) providers 5a and 5b, and (an apparatus of) an FTTH (Fiber To The Home) provider 6, which are connected by communications lines (for example, telephone lines, and optical cables) 7. Routers (not shown) for transferring data (packets) are properly inserted in the network 8.

Each of the nodes Nn is assigned a unique serial number and IP (Internet Protocol) address. The same serial number and the same IP address are not assigned to a plurality of nodes.

Figure 1:
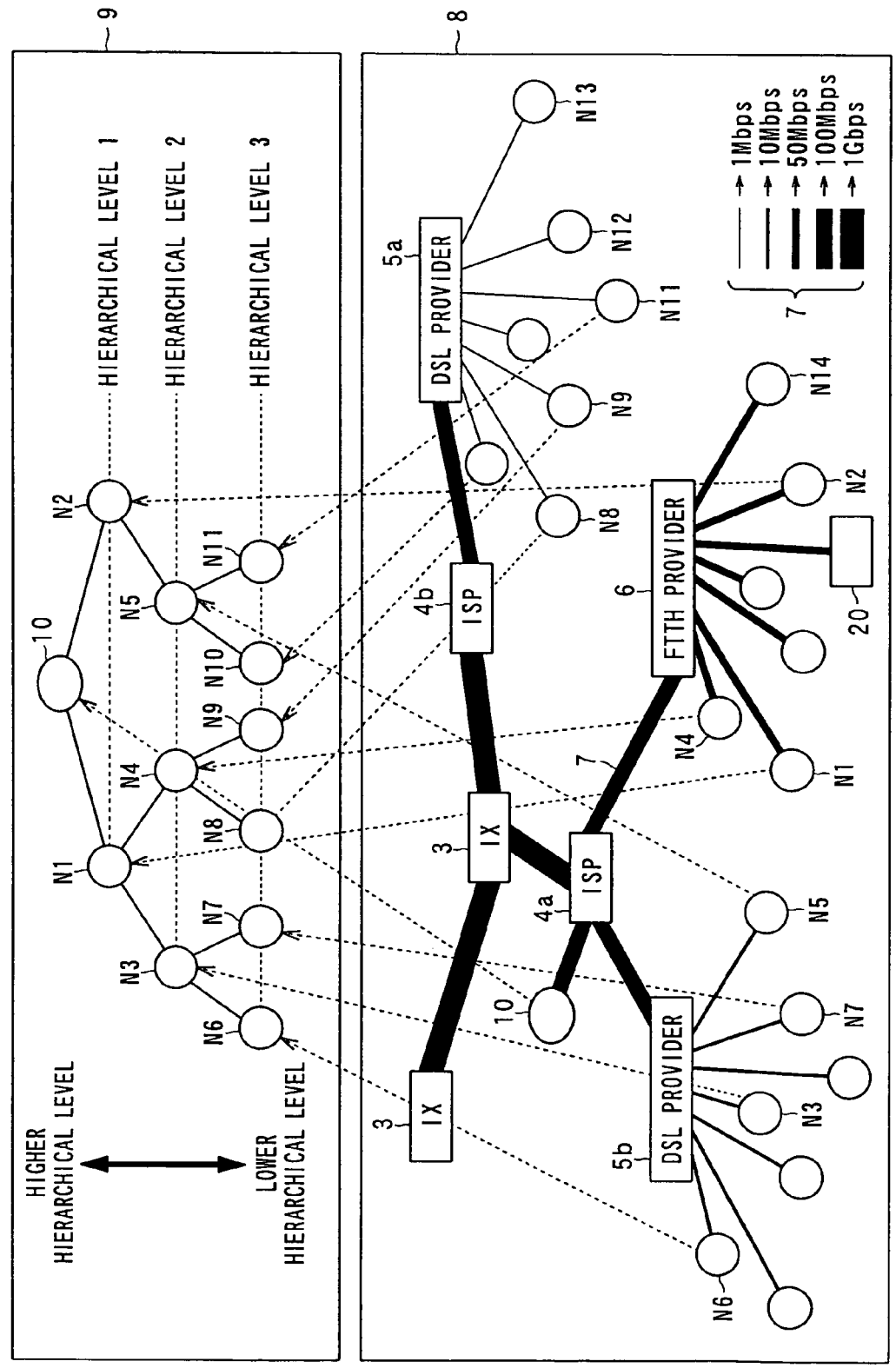
FIG. 1 is a diagram showing an example of a connection mode of node devices in a tree-shaped broadcasting system in an embodiment of the present invention.

The tree-shaped broadcasting system S is formed (constructed) by connecting the nodes Nn through a network 9 as shown in an upper frame in FIG. 1 out of the nodes Nn. The network 9 is an overlay network 9 (logical network) constructing a virtual link formed by using the existing network 8. The nodes Nn in the system S (in other words, a tree topology) are connected in a tree shape via the network 8, while forming a plurality of hierarchical levels with a broadcast station (broadcast device) 10 as a root at the highest level in the tree shape.

In the tree-shaped broadcasting system S, a content data stream broadcasted (for example, stream-distributed) by the broadcast station 10 is sequentially transferred from a node Nn in a higher level (hereinbelow, called an "upstream" node Nn) to a node Nn in a lower level (hereinbelow, called a "downstream" node Nn).

The tree topology formed in the tree-shaped broadcasting system S is managed by a connection destination introducing server 20.

Figure 2:
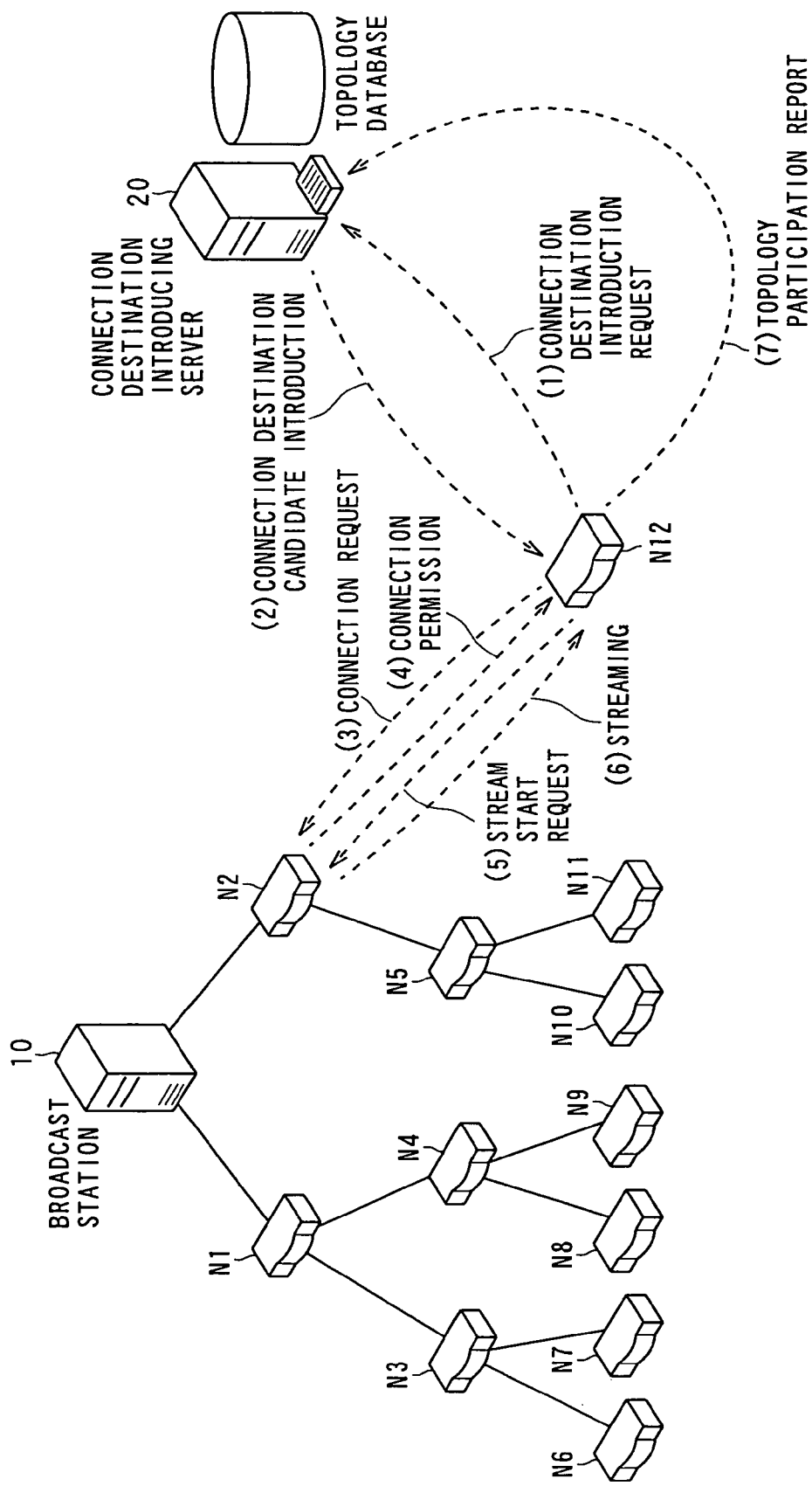
FIG. 2 is a conceptual diagram showing a state when a node participates in a tree-shaped broadcasting system.

FIG. 2 shows that a process of connecting a node N12 in the tree-shaped broadcasting system S. First, the node N12 transmits a message of requesting for introduction of a node Nn one level higher than the node N12 in the hierarchy or upstream of the node N12 (hereinbelow, called "upstream node") as a connection destination candidate to the connection destination introducing server 20 ((1) connection destination introduction request). The connection destination introducing server 20 retrieves one or more nodes Nn, which can be connected to the node N12 on its downstream side, from topology management information. The topology management information is stored in the connection destination introducing server 20. The connection destination introducing server 20 sends back to the node N12 a connection destination candidate introduction message including node information (for example, address information on a network such as IP address and port number) of the nodes as upstream node candidates ((2) connection destination candidate introduction). Next, the node N12 selects one node, for example, a node N2, from the upstream node candidates obtained from the connection destination introducing server 20, and transmits a connection request message to the node N2 ((3) connection request). The node N2 adds the information of the node N12 to a node management table which is stored in the connection destination introducing server 20 and sends back a connection permission response message to the node N12 ((4) connection permission). The node N12 transmits a stream start request message to the node N2 ((5) stream start request). The node N2 then starts streaming to the node N12 ((6) streaming). Finally, the node N12 transmits a topology participation report message to the connection destination introducing server 20 ((7) topology participation report). The connection of the node N12 to the tree-shaped broadcasting system S is completed.

On the other hand, in the case where the node N12 withdraws from (pulls out of) the tree-shaped broadcasting system S, the node N12 transmits a stream stop request message and a connection cancellation request message to the upstream node N2 which is a stream supplier. In response to the messages, the node N2 stops the streaming to the node N12 by discarding a stream relay object and, simultaneously, stops the connection to the node N12 by deleting the information of the node N12 from the node management table.

At this time, if there is a downstream node Nn directly connected to a node Nn which withdraws from the tree-shaped broadcasting system S, the downstream node Nn restores a broadcast path by, for example, any of the following methods a) and b).

a) Reproduction by Timeout Method

The downstream node Nn always monitors a streaming state from its upstream node Nn. When the downstream node Nn detects an interruption of a stream supply for predetermined time (occurrence of an autonomous reconnection event), it cancels the connection to the upstream node Nn, and connects to a new upstream node Nn that is located immediately upstream of the upstream node Nn that the downstream node Nn cancels the connection.

b) Reproduction by Event Notifying Method

When the upstream node Nn withdraws from the tree-shaped broadcasting system S, a withdrawal event is notified to its immediate downstream node Nn. When the downstream node Nn receives the withdrawal event from the upstream node Nn (occurrence of the autonomous reconnection event), the downstream node Nn cancels the connection to the upstream node Nn and connects to a new upstream node Nn that is located immediately upstream of the upstream node Nn that the downstream node Nn cancels the connection.

Each of nodes Nn connected in the tree-shaped broadcasting system S monitors a stream reception state from an upstream node Nn. When the stream reception state becomes below predetermined reception quality (occurrence of the autonomous reconnection event), each node Nn cancels the connection to the upstream node Nn and connects to a new upstream node Nn. As a criterion of evaluating the reception quality, an average packet rate in a past predetermined period and a packet loss ratio can be used.

1-1. Configuration of Broadcast Station 10

Figure 3:
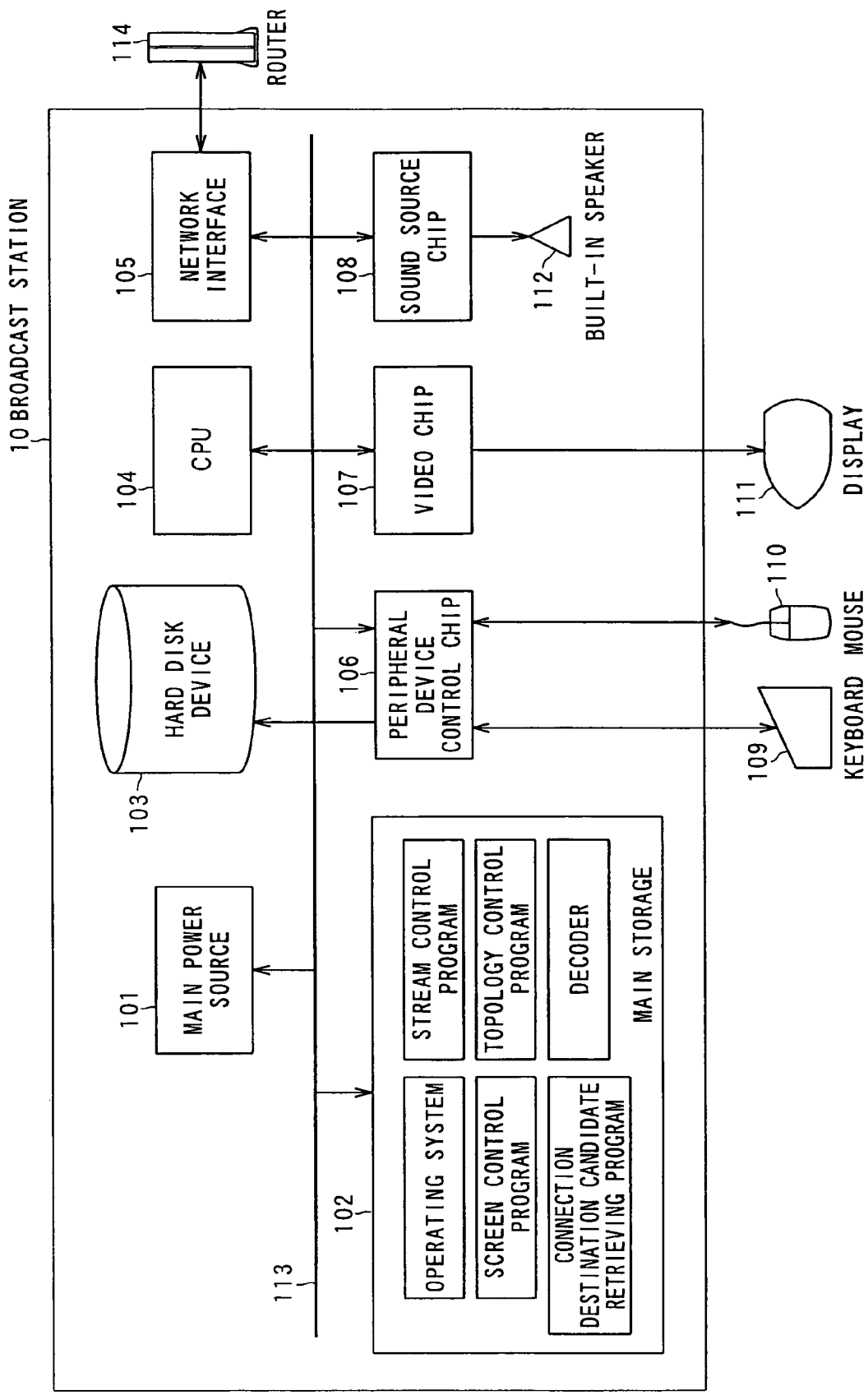
FIG. 3 is a diagram showing an example of a schematic configuration of a broadcast station.

With reference to FIG. 3, the configuration and the function of the broadcast station 10 will be described.

The broadcast station 10 includes, as shown in FIG. 3, a main power source 101, a main storage 102, a hard disk drive 103, a CPU 104, a network interface 105, a peripheral device control chip 106, a video chip 107, a sound source chip 108, and a built-in speaker 112. The broadcast station 10 is connected to the network 8 via a router 114. The broadcast station 10 may apply to a dedicated broadcast server or any of the nodes Nn.

The main power source 101, the main storage 102, the hard disk drive 103, the CPU 104, the network interface 105, the peripheral device control chip 106, the video chip 107, and the power source chip 108 are connected to each other via a system bus 113. A keyboard 109 and a mouse 110 are connected to the peripheral device control chip 106, and a display 111 is connected to the video chip 107.

The main storage 102 includes a RAM and a ROM, and stores an operating system, a stream control program, a screen control program, a topology control program, a connection destination candidate retrieving program, a decoder (program), and the like. The main storage 102 also stores a node management table. In the node management table, address information of nodes Nn connected on the downstream side of the broadcast station 10 is registered. The main storage 102 has a buffer memory (for example, a ring buffer).

In the hard disk drive 103, content data for broadcasting is recorded.

According to the various programs stored in the main storage 102 (that is, by execution of a program), for example, the CPU 104 performs a broadcast process of packetizing the content data recorded in the hard disk drive 103 and broadcasting the packetized data (stream distribution) to the downstream nodes Nn registered in the node management table.

1-2. Configuration of Connection Destination Introducing Server 20

Next, with reference to FIG. 4, the configuration and function of the connection destination introducing server 20 will be described.

Figure 4:
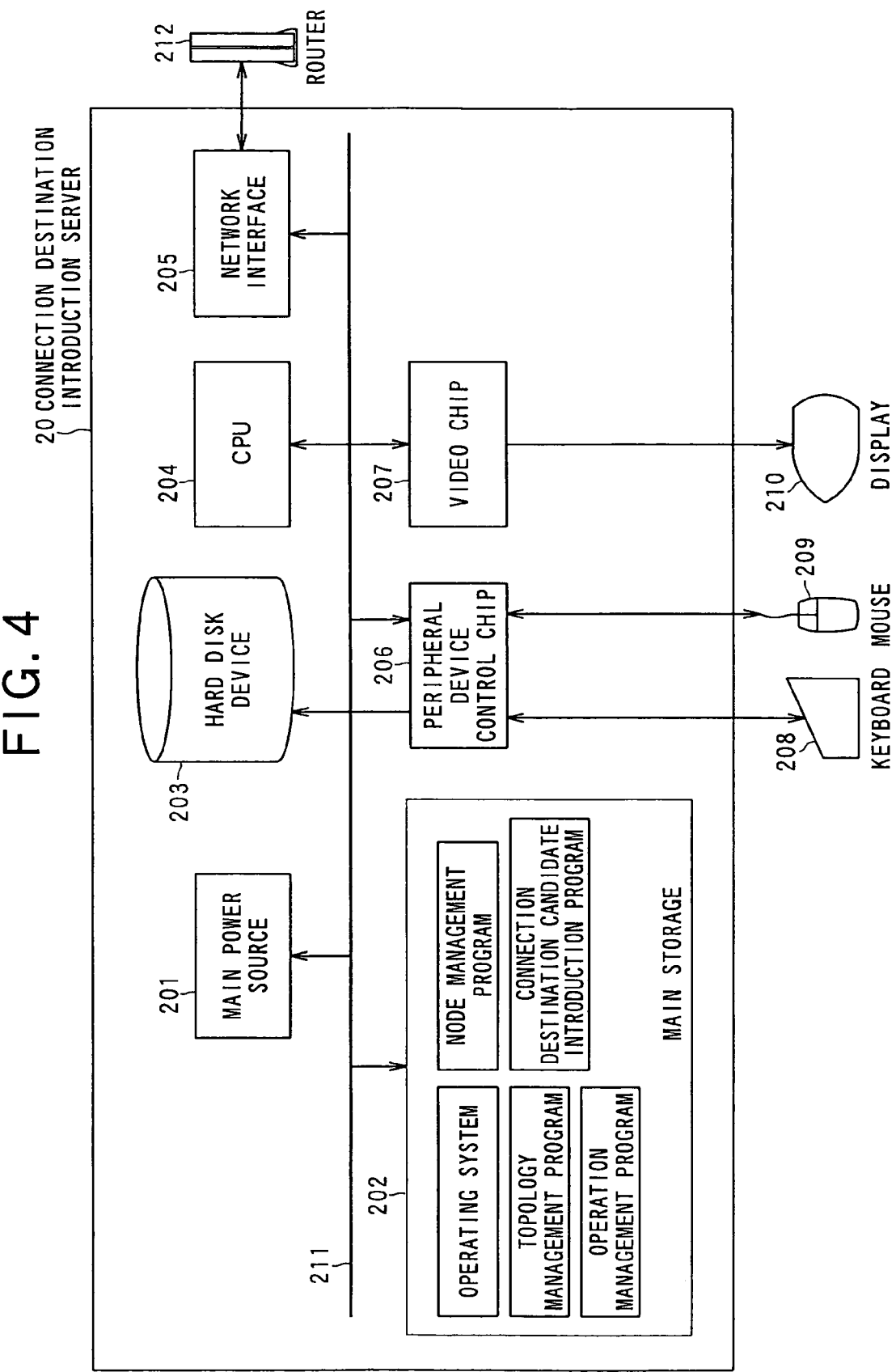
FIG. 4 is a diagram showing an example of a schematic configuration of a connection destination introducing server.

As shown in FIG. 4, the connection destination introducing server 20 includes a main power source 201, a main storage 202, a hard disk drive 203, a CPU 204, a network interface 205, a peripheral device control chip 206, and a video chip 207. The connection destination introducing server 20 is connected to the network 8 via a router 212.

The main power source 201, the main storage 202, the hard disk drive 203, the CPU 204, the network interface 205, the peripheral device control chip 206, and the video chip 207 are connected to each other via a system bus 211. A keyboard 208 and a mouse 209 are connected to the peripheral device control chip 206, and a display 210 is connected to the video chip 207.

The main storage 202 includes a RAM and a ROM, and stores an operating system, a node management program, a topology management program, a connection destination candidate introducing program, an operation management program, and the like.

In the hard disk drive 203, a broadcast station management database and a topology database are formed. In the broadcast station management database, location information (e.g., IP address, and port number) of each broadcast station 10 is registered so as to be associated with broadcast channel information (for example, channel number). In the topology database, topology management information is registered. The topology management information exits in each of the broadcast channels and is associated with the broadcast channel information. The topology management information includes node information of each of nodes Nn connected in a tree topology, a hierarchical level in which each of the nodes Nn is positioned in the tree topology, downstream node information of nodes connected immediately downstream of each node Nn, the connection allowable number of nodes which can be connected on the downstream side of each node Nn, and transfer capability of each node Nn that transfers content data to its downstream nodes Nn. The transfer capability denotes, for example, processing speed (GHz) of the CPU of each node Nn and the effective bandwidth (for example, data transfer speed (bps)) in the network 8.

According to the various programs stored in the main storage 202, for example, in response to a connection destination introduction request message from the node Nn, the CPU 204 performs a responding process of retrieving one or more connection destination candidates of nodes connected on the downstream side whose number is less than the connection allowable number (that is, retrieving nodes Nn which can be connected on the downstream side) from the topology management information and sending back a connection destination candidate introduction message including the node information of the connection destination candidates retrieved.

1-3. Configuration of Node Nn

The configuration and the function of each node Nn will be described with reference to FIG. 5.

Figure 5:
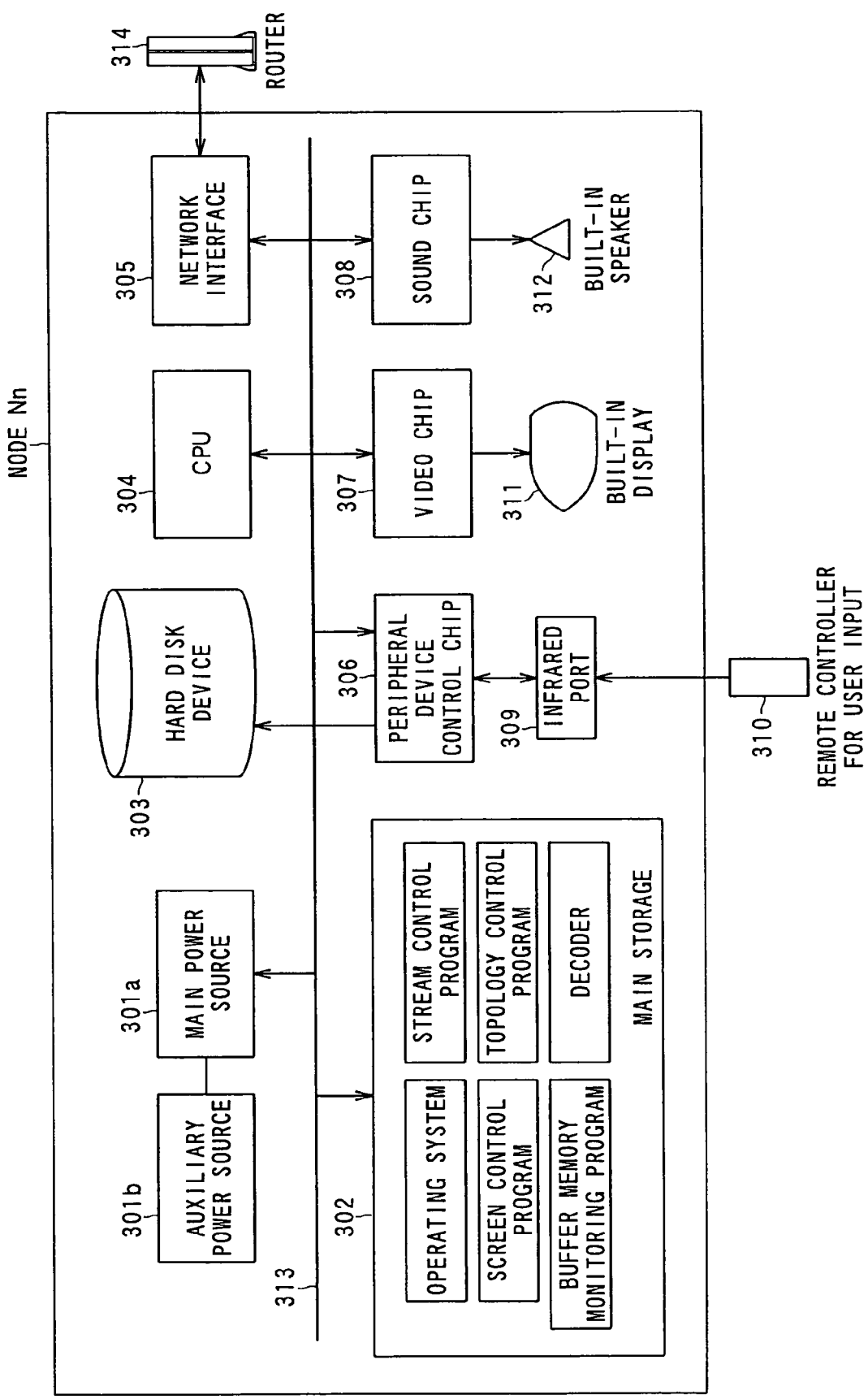
FIG. 5 is a diagram showing an example of a schematic configuration of a node.

As shown in FIG. 5, each node Nn includes a main power source 301*a*, an auxiliary power source 301*b*, a main storage 302, a hard disk drive 303, a CPU 304, a network interface 305, a peripheral device control chip 306, a video chip 307, a sound source chip 308, an infrared port 309 for performing infrared communication with a remote controller 310 for user input, a built-in display 311, and a built-in speaker 312. The node Nn is connected to the network 8 via a router 314. The node Nn can be applied to a PC, an STB (Set Top Box), a TV receiver, or the like.

The main power source 301*a*, the main storage 302, the hard disk drive 303, the CPU 304, the network interface 305, the peripheral device control chip 306, the video chip 307, and the sound source chip 308 are connected to each other via a system bus 313.

The main storage 302 includes a RAM and a ROM, and stores an operating system, a stream control program, a screen control program, a topology control program, a buffer memory monitoring program, a decoder, and the like.

In the main storage 302, location information (IP address, port number, and the like) of the connection destination introducing server 20 is stored. The main storage 302 stores a node management table. In the node management table, node information (e.g., IP address and port number) of the downstream node Nn connected directly to the node Nn is registered.

The main storage 302 has a buffer memory (for example, a ring buffer) for temporarily storing packets constructing received content data.

According to the various programs stored in the main storage 302 (including the node process program of the present invention), the CPU 304 executes a new participation process to participate in the tree-shaped broadcasting system S. After participation, the CPU 304 performs a reproducing process while buffering packets of content data, which are distributed from the broadcast station 10 or an upstream node Nn one level higher than the node Nn and received via the network interface 305.

In the new participation process, a connection destination introduction request message is transmitted to the connection destination introduction server 20, connection (session) is established to an upstream node Nn introduced from the connection destination introduction server 20, and a stream start request is made.

In the reproducing process, content data (for example, video data and audio data) received and stored in the buffer memory is read and decoded by the decoder. The decoded video data (video information) is output to the built-in display 311 (or an external display, which is not shown) via the video chip 307, and the decoded audio data (audio information) is output from the built-in speaker 312 (or an external speaker, which is not shown) via the sound source chip 308.

In the case where a downstream node Nn is connected to the node of the CPU 304, the CPU 304 performs a transfer process of transferring packets of content data stored in the buffer memory to the downstream node Nn (relaying a content stream).

Further, by execution of the program, the CPU 304 functions as a receiver, a lost packet detector, a packet complement request information transmitter, a dummy packet transmitter, a complementary packet transmitter, a hold time selector, a hold time calculator, and the like of the present invention.

The CPU 304 as packet detecting means detects a lost packet in a plurality of packets (content packets) broadcasted from the broadcast station 10. For example, at the time of storing packets received from the broadcast station 10 or the upstream node Nn into a buffer memory, the CPU 304 detects a packet loss event by checking continuity of sequence numbers of the packets.

Figure 6:
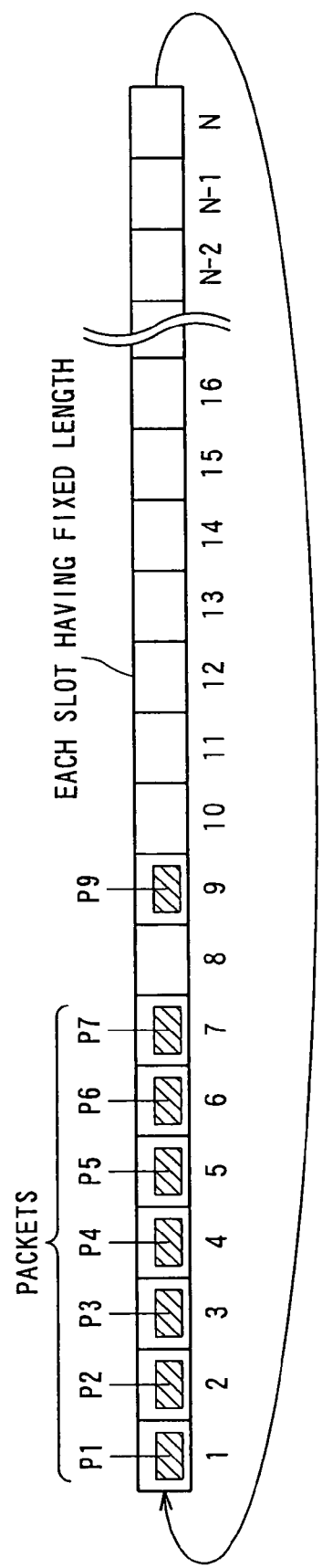
FIG. 6 is a diagram showing an example of a structure of a buffer memory.

FIG. 6 is a diagram showing an example of the structure of a buffer memory. At the time of initialization, the CPU 30 prepares a sequence of continuous data regions, called slots each having a circulation structure, on the main storage 302 and assigns continuous sequence numbers from 1 to N (natural number) to the slots. In a node Nn, for example, when a packet is received from its immediate upstream node Nn, the sequence number of the packet is checked, and the packet is stored in a slot having the same number as that of the packet, thereby storing packet data. Even if a packet whose sequence number is not continuous (e.g. a packet whose sequence number is nine in the example of FIG. 6) is received, the packet is properly stored in a slot having the same number as that of the packet.

In the case where a loss is detected (e.g. a packet whose sequence number is eight in the example of FIG. 6), the CPU 304 of the node Nn which detects the loss transmits a packet complement request message (packet complement request information) indicative of the packet complement request for complementing the lost packet to the broadcast station 10 or the upstream node Nn. Further, in the case where a downstream node Nn is connected to the node of the CPU 304 when the loss of the packet is detected, the CPU 304 generates a dummy packet including the sequence number corresponding to the lost packet and transmits the dummy packet to the downstream node Nn directly connected to the node Nn prior to relay of the received packets.

After transmission of the packet complement request message, when the CPU 304 of the node Nn which detects the loss receives a complementary packet of the packet complement request is received from the broadcast station 10 or the upstream node Nn, the CPU 304 transmits the received complementary packet to the downstream node Nn directly connected to the node Nn.

Figure 7:
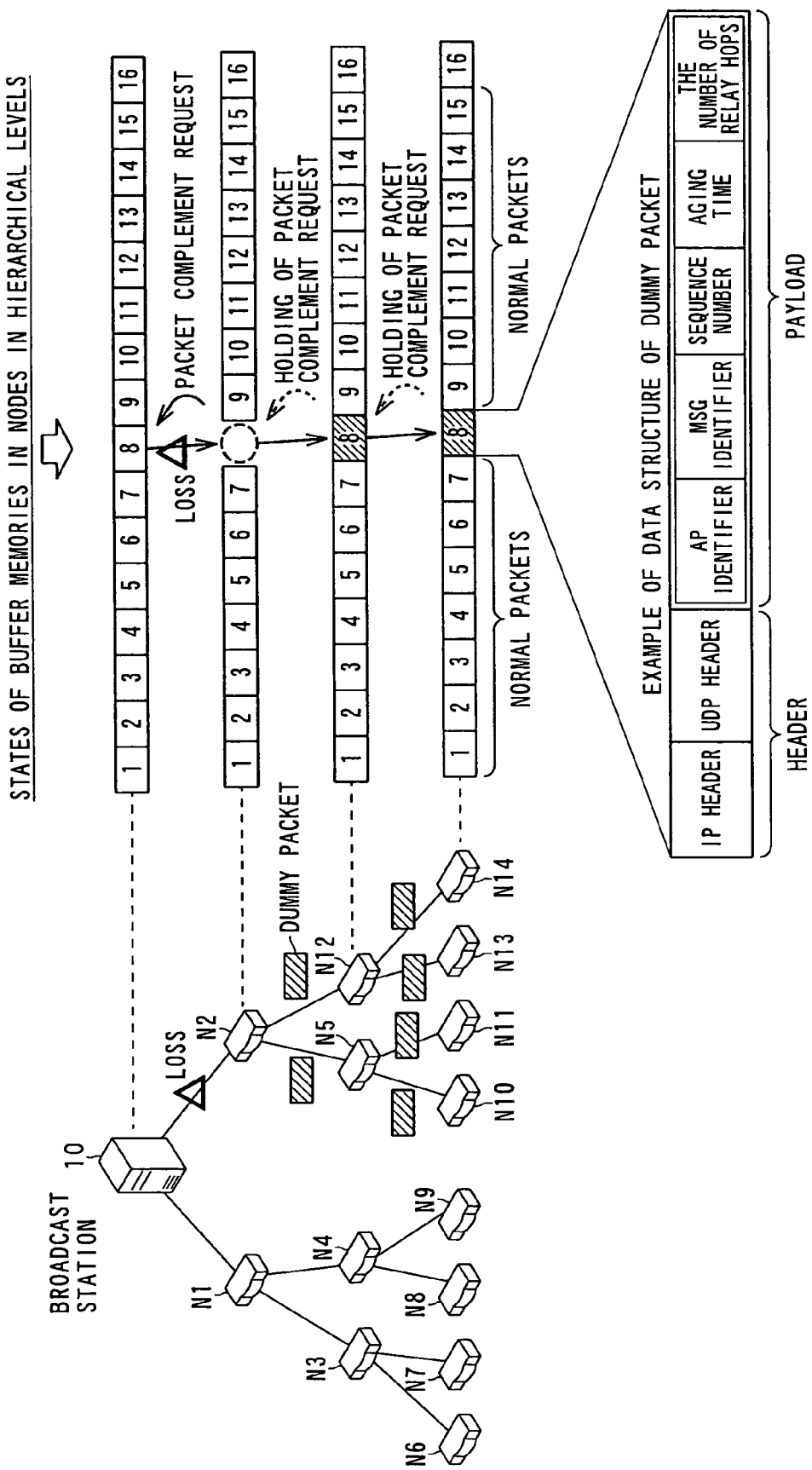
FIG. 7 is a conceptual diagram showing a state where a dummy packet is transmitted.

In the example of FIG. 7, a packet whose sequence number is eight is lost between the broadcast station 10 and the node N2. A dummy packet substituting for the lost packet No. 8 is generated by the node N2 and transmitted to its immediate downstream nodes N5 and N12. Further, the node N5 transmits the received dummy packet to its immediate downstream nodes N10 and N11 (the node N12 operates similarly). The received dummy packet is stored in the slot corresponding to the sequence number included in the dummy packet (in the example of FIG. 6, the slot No. 8).

The dummy packet has a data structure as shown in FIG. 7. In a payload, an application (AP) identifier, a message (MSG) identifier, a sequence number, aging time, and the number of relay hops are written. The AP identifier is identification information unique to the program. The MSG identifier is identification information unique to the message. The sequence number is a sequence number of a dummy packet in packets of content data. The aging time is a value for determining an existence period (in other words, hold time which will be described later) since the dummy packet is generated until it is distinguished. The number of relay hops is the number of relay hops by the nodes Nn starting the broadcast station 10 as a starting point. The number of relay hops is incremented in each of the reception nodes Nn.

The dummy packet is used to cause the downstream node Nn to delay transmission of the packet complement request message for a predetermined hold time. The dummy packet is transmitted to the downstream node Nn in place of the lost packet. As the CPU 304 of the downstream node Nn which received the dummy packet regards the dummy packet as a normal content packet and checks continuity of the sequence numbers of packets including the dummy packet, it does not redundantly detect the packet loss event which occurred on the upstream side, and does not generate the packet complement request only for the hold time. As a result, chained generation of packet complement requests can be suppressed.

Normally, while waiting for generation of a packet complement request only for the hold time in the downstream node Nn which received the dummy packet, the node Nn which detected the packet loss first (e.g. the node N2 in the example of FIG. 7) asks the broadcast station 10 or the upstream node Nn to re-transmit a complementary packet, and the node Nn relays the complementary packet to the downstream node Nn. As a result, the dummy packet is replaced with the complementary packet in the downstream node Nn which has already received the dummy packet, and complementation of the lost packet is completed. That is, the dummy packet temporarily stored in the slot (e.g. slot No. 8 in the example of FIG. 6) is replaced with the complementary packet transmitted with delay.

However, in the tree topology, for example, when withdrawal (separation) of the upstream node Nn is regarded as a trigger, the process of reconnection to an upstream node (connection destination changing) occurs. If the process is performed in a state where the dummy packet is stored in the buffer memory, a complementary packet corresponding to the dummy packet cannot be received from the upstream node Nn which detected the loss first. To avoid the situation, when the hold time elapses, the CPU 304 of the downstream node Nn having the dummy packet makes the dummy packet in the buffer memory invalid. Using this as a trigger, the packet complement request is issued to the present immediate upstream node Nn, thereby reliably replacing the dummy packet with a true content packet. That is, in the case where the hold time elapses, the packet complement request message indicative of the packet complement request for complementing the lost packet corresponding to the dummy packet is transmitted to the upstream node Nn.

The hold time elapsed until the packet complement request message is transmitted in the downstream node Nn is determined considering reproduction transition time elapsed until content data included in a packet stored in the buffer memory is reproduced, for example, a time period (10 to 30 seconds) from when the packet is stored in the buffer memory to when the packet is read by the decoder (so that the hold time becomes shorter by the reproduction transition time). The hold time is also determined on the basis of the aging time written in the payload of the dummy packet.

As the aging time, for example, a time period from when a packet loss event is detected to when the hold time (for example, 10 seconds) is expired is written in the payload of a dummy packet in the node Nn that generates a dummy packet, and the dummy packet is transmitted. In the case where the time written as the aging time arrives in the node Nn which received the dummy packet (that is, in the case where the hold time times out), the packet complement request message is transmitted from the node Nn which received the dummy packet to its immediate upstream node Nn.

Alternatively, as the aging time, the packet loss detection time and the hold time (for example, 10 seconds) may be written in the payload of a dummy packet in the node Nn that generates a dummy packet and the dummy packet may be transmitted. In this case, time after a lapse of the hold time since the lost detection time written as the aging time is calculated by the CPU 304 of the node Nn which received the dummy packet. When the time arrives, a packet complement request message is transmitted from the node Nn which received the dummy packet to its immediate upstream node Nn. Alternatively, as the aging time, it is also possible to write only packet loss detection time in the payload of a dummy packet in a node Nn which generates a dummy packet, and preliminarily set the hold time (for example, 10 seconds) in all of the nodes Nn. In this case as well, time after the lapse of the hold time since the loss detection time written as the aging time is calculated by the node Nn which received the dummy packet.

In the above example, however, a problem occurs such that timeouts of the hold times in the nodes Nn each which received the dummy packet are synchronized, and the packet complement request messages are transmitted from the nodes Nn in a concentrated short time. Therefore, it is desirable to set the hold times so as to be varied among some of the nodes Nn.

As an example, there is a method of determining the hold time at random in a predetermined range. As the aging time, packet loss detection time and a pre-determined hold time range (for example, 10 to 30 seconds) are written in the payload of a dummy packet in the node Nn which generates a dummy packet, and the dummy packet is transmitted. The CPU 304 of the node Nn which received the dummy packet selects a hold time in the hold time range (for example, 10 seconds (the minimum value) to 30 seconds (the maximum value)) at random (by generating a random number), calculates time elapsed between the loss detection time written as the aging time and a lapse of the selected hold time and, when the calculated time arrives, transmits a packet complement request message to an upstream node Nn. This reduces concentrated transmission of the packet complement request messages from the nodes Nn in short time. It is also possible to write only packet loss detection time as the aging time into the payload of a dummy packet in a node Nn which generates a dummy packet, and preliminarily set the hold time range in all of the nodes Nn.

As another example, there is a method of determining the hold time according to a hierarchical level of a node Nn which received a dummy packet. For example, as the aging time, packet loss detection time and reference time (for example, 10 seconds) are written in the payload of a dummy packet in the node Nn which generates a dummy packet. The CPU 304 of the node Nn which received the dummy packet calculates hold time (specifically, hold time according to the hierarchical level of the node Nn) by adding a value proportional to the hierarchical level of the node Nn (the hierarchical level becomes larger toward the downstream) to the reference time (for example, hold time=hierarchical level×fixed value (for example, 1 second)+reference time). The CPU 304 then computes time after lapse of the calculated hold time since the loss detection time written as the aging time and, when the computed time arrives, transmits the packet complement request message to an upstream node Nn. For example, in a node Nn whose hierarchical level is "20", the hold time is 30 seconds. This reduces concentrated transmission of the packet complement request messages from the nodes Nn in short time. As the nodes Nn located at lower levels in the hierarchy are assigned with longer hold times, the efficiency increases. It is also possible to write only packet loss detection time as the aging time into the payload of a dummy packet in a node Nn which generates a dummy packet, and preliminarily set the reference time in all of the nodes Nn.

In the above, the time as a reference (start point) of hold time (in other words, hold time counting start time) is used as the loss detection time. As another example, the time as a reference of the hold time may be dummy packet reception time in each of the nodes Nn. In this case, the dummy packet loss detection time may not be included in the aging time. In addition, timeouts of hold times can be prevented from being synchronized to some extent.

The node Nn which performed the process of reconnection to an upstream node in a state where a dummy packet is stored in a buffer memory may transmit the packet complement request message to an upstream node Nn immediately without waiting for lapse of the hold time after the reconnection.

2. Operation of Tree-Shaped Broadcasting System S

The operation of the tree-shaped broadcasting system S of the embodiment will now be described.

(Processes of Node Nn)

First, a process of the CPU 304 in the node Nn will be described with reference to FIGS. 8 to 11.

Figure 8:
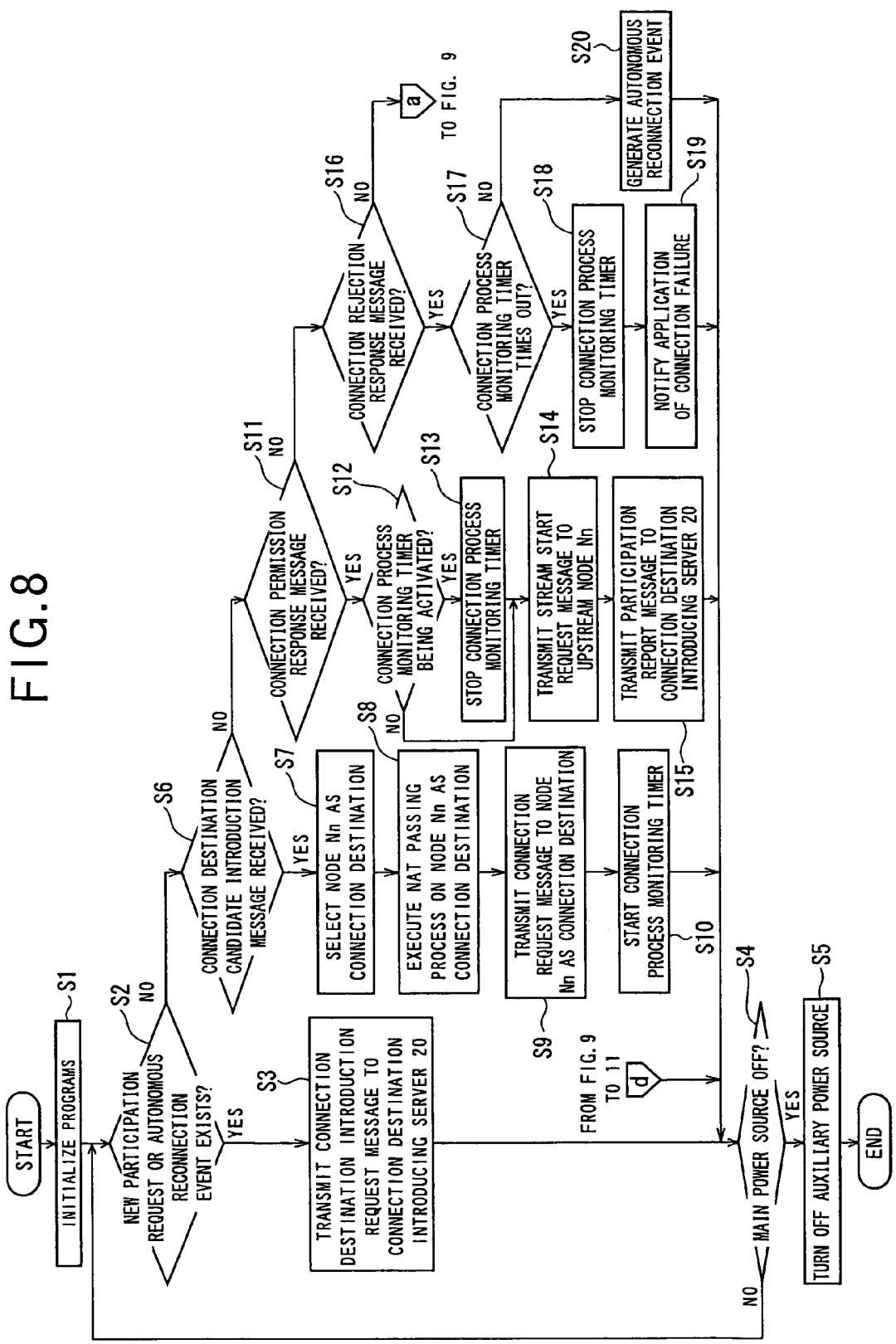
FIG. 8 is a flowchart showing processes executed by a CPU in the node.
Figure 9:
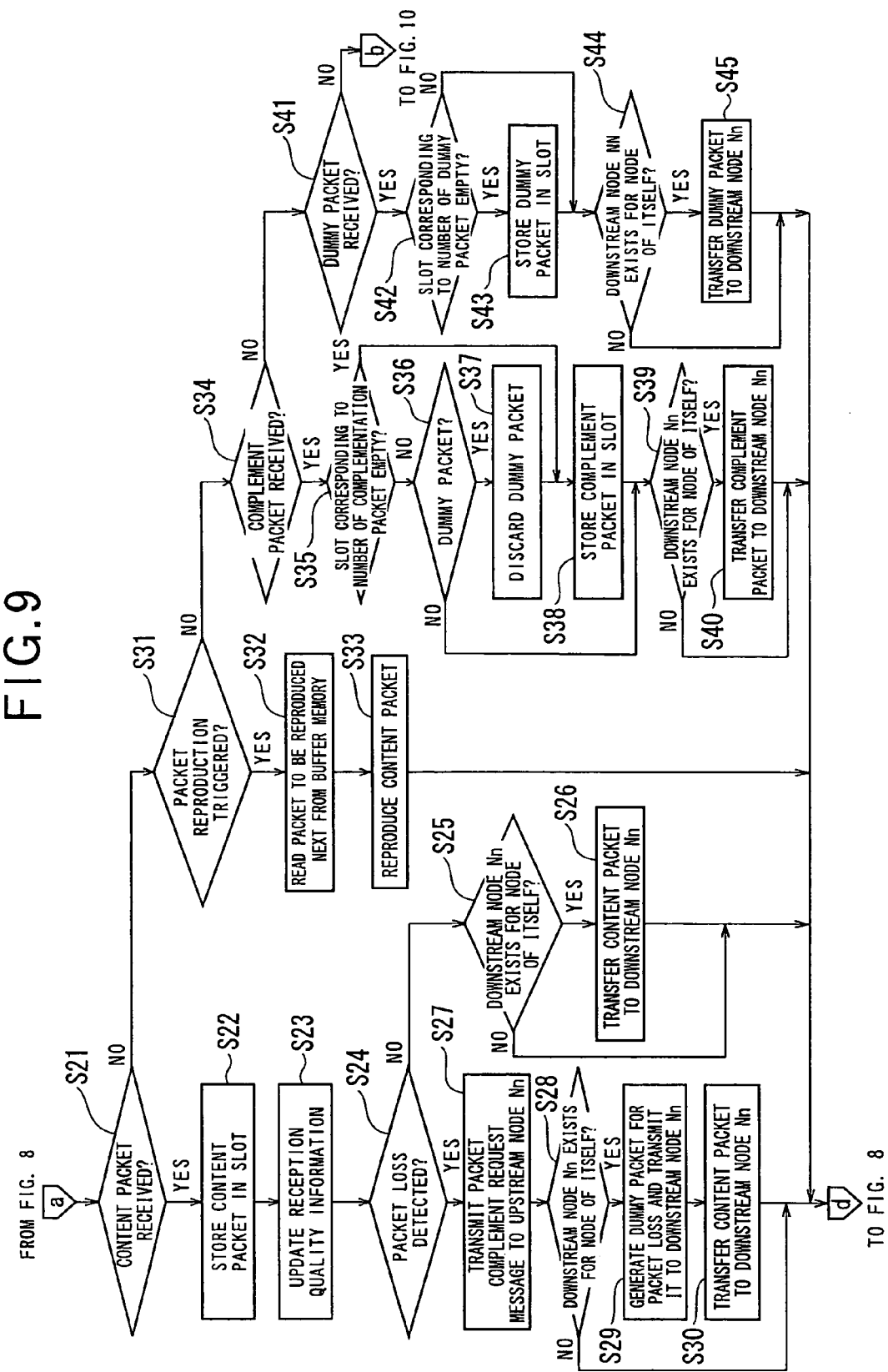
FIG. 9 is a flowchart showing processes executed by the CPU in the node.
Figure 10:
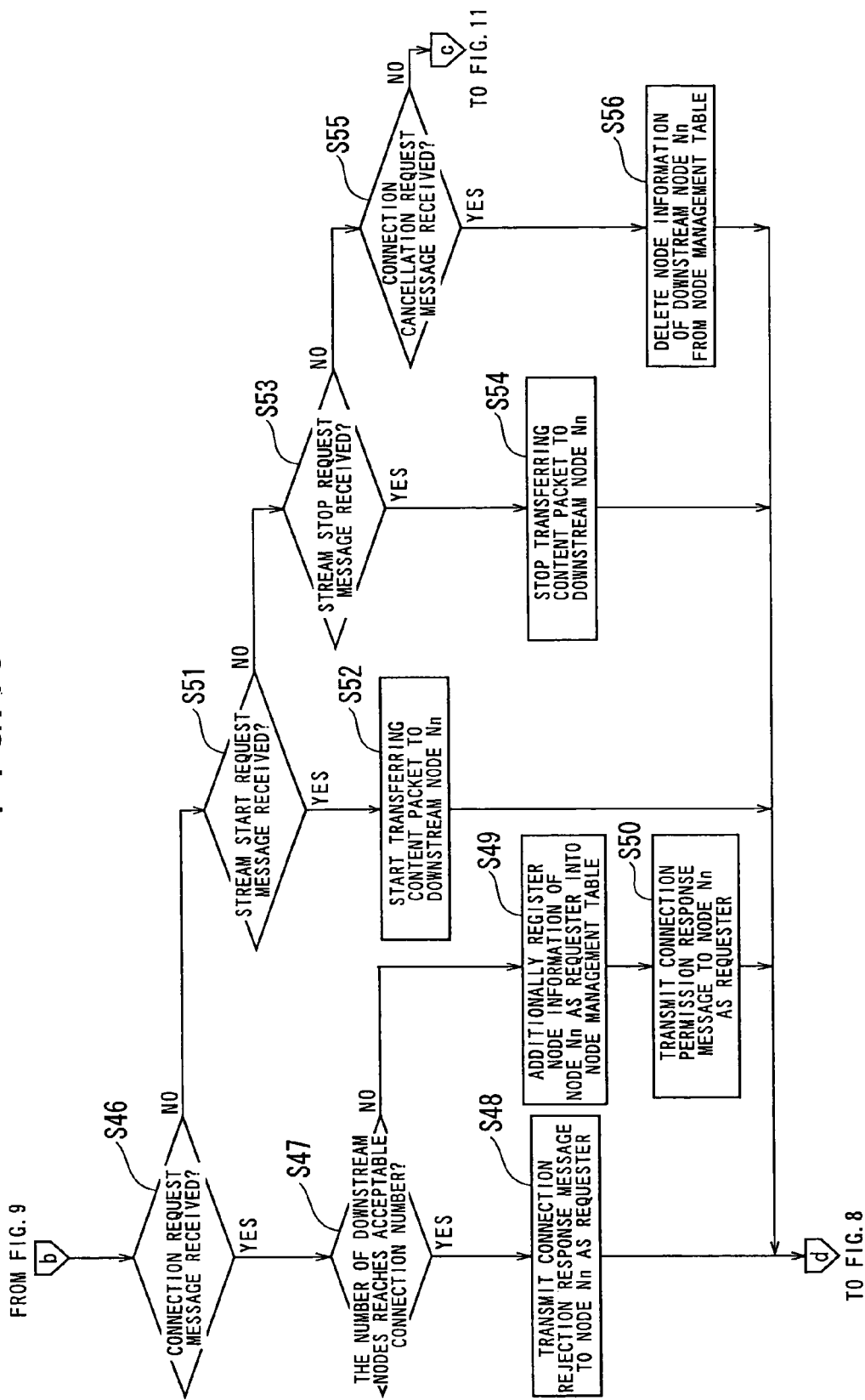
FIG. 10 is a flowchart showing processes executed by the CPU in the node.
Figure 11:
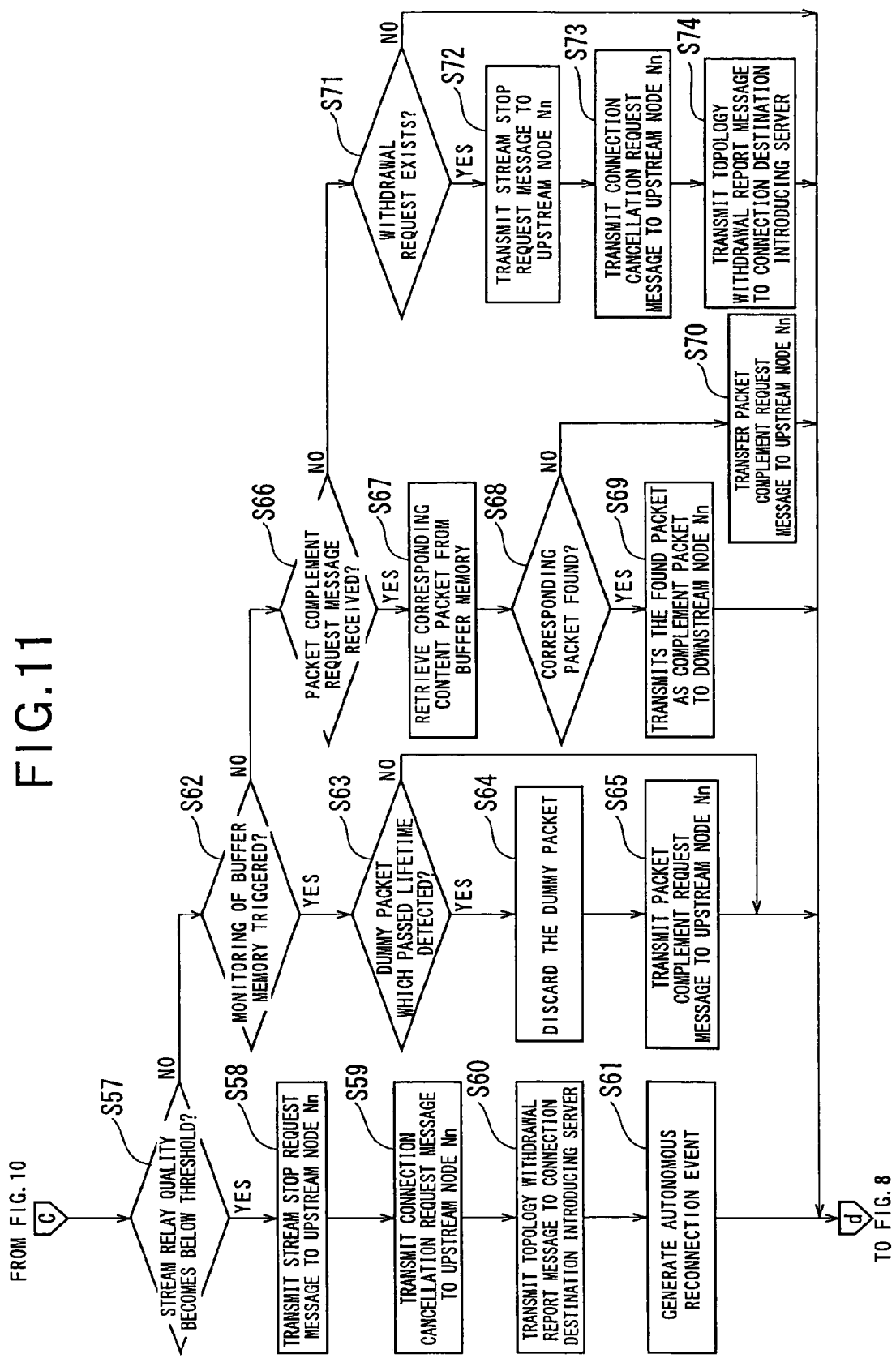
FIG. 11 is a flowchart showing processes executed by the CPU in the node.

When the node Nn is started by, for example, turning on the main power source 301*a* and the auxiliary power source 301*b*, the CPU 304 executes the process of FIG. 8. When the process starts, in step S1, various programs in the node Nn are initialized.

In step S2, a determination is made as to whether a new participation request from the user is received via the user input remote controller 310, or whether the autonomous reconnection event occurs (is generated).

In the case where a new participation request from the user is received, or the autonomous reconnection event occurs (YES in step S2), the CPU 304 advances to step S3. In the case where there is no new participation request from the user and no autonomous reconnection event occurs (NO in step S2), the CPU 304 advances to step S6.

In step S3, a connection destination candidate introduction request message is transmitted to the connection destination introducing server 20 in accordance with location information of the connection destination introducing server 20.

In step S4, a determination is made as to whether the main power source 301*a* of the node Nn is turned off. When the main power source 301*a* is turned off (YES in step S4), the CPU 304 moves to step S5. When the main power source 301*a* is not turned off (NO in step S4), the CPU 304 returns to step S2.

In step S5, using turn-off of the main power source 301*a* as a trigger, the various programs are finished, the auxiliary power source 301*b* is turned off, and the process is finished.

In step S6, a determination is made as to whether a connection destination candidate introduction message is received from the connection destination introducing server 20. In the case where the connection destination candidate introduction message is received (YES in step S6), the CPU 304 advances to step S7. In the case where the connection destination introduction message is not received (NO in step S6), the CPU 304 advances to step S11.

In step S7, a node Nn satisfying a condition (or randomly) is selected as a connection destination (or a reconnection destination) from one or more connection destination (upstream node) candidates obtained in response to reception of the connection destination candidate introduction message.

In step S8, an NAT passing process (process for making a packet pass from a network on a WAN side of a router to a LAN-side network) is performed on the selected node Nn as the connection destination.

In step S9, a connection request message is transmitted to the selected node Nn as the connection destination.

In step S10, a connection process monitoring timer for monitoring the connecting process is started, and the CPU 304 returns to step S4.

In step S11, a determination is made as to whether a connection permission response message is received from the upstream node Nn which has received the connection request message.

In the case where the connection permission response message is received (YES in step S11), the CPU 304 advances to step S12. In the case where the connection permission response message is not received (NO in step S11), the CPU 304 advances to step S16.

In step S12, a determination is made as to whether the connection process monitoring timer is being activated. In the case where the connection process monitoring timer is being activated (YES in step S12), the timer is stopped (step S13), and the CPU 304 advances to step S14. In the case where the connection process monitoring timer is not being activated (NO in step S12), the CPU 304 advances to step S14 without stopping the timer.

In step S14, a stream start request message is transmitted to the upstream node Nn which has transmitted the connection permission response message.

In step S15, the CPU 304 sends a message reporting participation of the node of itself to the tree topology to the connection destination introducing server 20, and returns to step S4.

In step S16, a determination is made as to whether a connection rejection response message is received from the upstream node Nn which has received the connection request message.

In the case where the connection rejection response message is received (YES in step S16), the CPU 304 advances to step S17. In the case where the connection rejection response message is not received (NO in step S16), the CPU 304 advances to step S21.

In step S17, a determination is made as to whether the connection process monitoring timer has timed out. In the case where the connection process monitoring timer times out (connection process timeout) (YES in step S17), the CPU 304 advances to step S18. In the case where no timeout occurs (the connecting process can be performed again) (NO in step S17), the CPU 304 advances to step S20.

In step S18, the connection process monitoring timer is stopped. In step S19, a connection failure notification is sent to the application. After that, the CPU 304 returns to step S4.

In step S20, the autonomous reconnection event is generated, and the CPU 304 returns to step S4.

In step S21, a determination is made as to whether a content packet is received from the broadcast station 10 or the upstream node Nn. In the case where the content packet is received (YES in step S21), the CPU 304 advances to step S22. In the case where the content packet is not received (NO in step S21), the CPU 304 advances to step S31.

In step S22, the received content packet is stored in a slot of the proper sequence number in the buffer memory.

In step S23, for example, reception quality information managed by the main storage 302 is updated. For example, the CPU 304 calculates average packet rate in past one minute, average packet loss ratio, packet arrival fluctuation, and the like as the reception quality information, and updates reception quality information calculated and stored in the past.

In step S24, the sequence number of the content packet stored in the slot this time is compared with the sequence number of the content packet stored in the slot last time. By checking the continuity of the sequence numbers, a determination is made as to whether a packet loss occurs. When a packet loss is detected (YES in step S24), the CPU 304 advances to step S27. When a packet loss is not detected (NO in step S24), the CPU 304 advances to step S25.

In step S25, the CPU 304 determines whether a downstream node Nn exists for the node of itself (whether a downstream node Nn is directly connected to the node of itself). In the case where a downstream node Nn exists for the node of the CPU 304 (YES in step S25), the CPU 304 advances to step S26. In the case where a downstream node Nn does not exist for the node of the CPU 304 (NO in step S25), the CPU 304 returns to step S4.

In step S26, the CPU 304 transfers (relays) the content packet to the downstream node Nn connected to the node of itself and returns to step S4.

In step S27, the CPU 304 transmits a packet complement request message to an upstream node Nn to which the node of itself is connected.

In step S28, the CPU 304 determines whether a downstream node Nn exists for the node of itself. In the case where a downstream node Nn exists for the node of the CPU 304 (YES in step S28), the CPU 304 advances to step S29. In the case where a downstream node Nn does not exist for the node of the CPU 304 (NO in step S28), the CPU 304 returns to step S4.

In step S29, the CPU 304 generates a dummy packet to which the sequence number of the lost packet for the packet loss is assigned, and transmits the dummy packet to the downstream node Nn connected to the node of itself.

In step S30, the CPU 304 transfers (relays) the content packet to the downstream node Nn directly connected to the node of itself, and returns to the step S4. A packet received from the upstream side is relayed to the downstream node Nn irrespective of the presence or absence of a packet loss.

In step S31, a determination is made as to whether reproduction of a content packet is triggered. In the case where a trigger of reproducing a content packet is given (YES in step S31), a content packet to be reproduced next is read from the buffer memory (step S32). The packet is output to a decoder, and content data is reproduced via the video chip 307 and the sound source chip 308 (step S33). On the other hand, in the case where the content packet reproduction is not triggered (NO in step S31), the CPU 304 advances to step S34.

In step S34, a determination is made as to whether a complementary packet is received from the broadcast station 10 or the upstream node Nn. In the case where the complementary packet is received (YES in step S34), the CPU 304 advances to step S35. In the case where the complementary packet is not received (NO in step S34), the CPU 304 advances to step S41.

In step S35, the state of the slot corresponding to the sequence number of the received complementary packet is checked, and a determination is made as to whether the slot is empty (has no data). In the case where the slot is not empty (NO in step S35), the CPU 304 advances to step S36. In the case where the slot is empty (YES in step S35), the CPU 304 advances to step S38.

In step S36, a determination is made as to whether a dummy packet is stored in the slot which is not empty. In the case where the dummy packet is not stored (that is, a content packet is stored) (NO in step S36), the CPU 304 advances to step S39. In the case where a dummy packet is stored (YES in step S36), the dummy packet is discarded (deleted) (step S37), and the CPU 304 advances to step S38.

In step S38, the received complementary packet is stored as a content packet into the slot.

In step S39, the CPU 304 determines whether the downstream node Nn exists for the node Nn of the CPU 304. In the case where the downstream node Nn exists for the node Nn of the CPU 304 (YES in step S39), the CPU 304 advances to step S40. In the case where the downstream node Nn does not exist for the node Nn of the CPU 304 (NO in step S39), the CPU 304 returns to step S4.

In step S40, the CPU 304 transfers (relays) the complementary packet to the downstream node Nn connected to the node Nn of the CPU 304, and returns to the step S4 of FIG. 8.

In step S41, a determination is made as to whether a dummy packet is received from the upstream node Nn. In the case where a dummy packet is received (YES in step S41), the CPU 304 advances to step S42. In the case where a dummy packet is not received (NO in step S41), the CPU 304 advances to step S46 of FIG. 10.

In step S42, a determination is made as to whether a slot corresponding to the sequence number of the received dummy packet is empty. In the case where the slot is not empty (NO in step S42), the CPU 304 advances to step S44. In the case where the slot is empty (YES in step S42), the CPU 304 advances to step S43.

In step S43, the received dummy packet is stored in the slot.

In step S44, the CPU 304 determines whether the downstream node Nn exists for the node Nn of the CPU 304. In the case where the downstream node Nn exists for the node Nn of the CPU 304 (YES in step S44), the CPU 304 advances to step S45. In the case where the downstream node Nn does not exist for the node Nn of the CPU 304 (NO in step S44), the CPU 304 returns to step S4 of FIG. 8.

In step S45, the CPU 304 transfers (relays) the dummy packet to the downstream node Nn connected to the node Nn of the CPU 304, and returns to the step S4 of FIG. 8.

In step S46, a determination is made as to whether a connection request message is received from another node Nn. In the case where the connection request message is received (YES in step S46), the CPU 304 advances to step S47. In the case where the connection request message is not received (NO in step S46), the CPU 304 advances to step S51.

In step S47, the CPU 304 determines whether the number of downstream nodes Nn connected to the node Nn of the CPU 304 reaches the acceptable connection number (upper limit) of the node Nn. In the case where the number of downstream nodes Nn reaches the acceptable connection number of the node Nn of the CPU 304 (YES in step S47), the CPU 304 advances to step S48. In the case where the number of downstream nodes Nn has not reached the acceptable connection number of the node Nn of the CPU 304 (NO in step S47), the CPU 304 advances to step S49.

In step S48, the CPU 304 transmits a connection rejection response message to the node Nn which has transmitted the connection request message, and returns to step S4 of FIG. 8.

In step S49, node information of the node Nn which has transmitted the connection request message is additionally registered as node information of the downstream node in the node management table.

In step S50, the CPU 304 transmits a connection permission response message to the node Nn which has transmitted the connection request message, and returns to step S4.

The node Nn which has transmitted the connection request message becomes a new downstream node Nn connected to the node Nn of the CPU 304.

In step S51, a determination is made as to whether a stream start request message is received from a downstream node Nn connected to the node Nn of the CPU 304. In the case where the stream start request message is received (YES in step S51), the CPU 304 advances to step S52. In the case where the stream start request message is not received (NO in step S51), the CPU 304 advances to step S53.

In step S52, the CPU 304 starts transfer (relay) (starts streaming) of a content packet to the downstream node Nn that has transmitted the stream start request message, and returns to step S4 of FIG. 8.

In step S53, a determination is made as to whether a stream stop request message is received from the downstream node Nn connected to the node of the CPU 304. In the case where the stream stop request message is received (YES in step S53), the CPU 304 advances to step S54. In the case where the stream stop request message is not received (NO in step S53), the CPU 304 advances to step S55.

In step S54, the CPU 304 stops transfer (stops streaming) of a content packet to the downstream node Nn, and returns to step S4.

In step S55, the CPU 304 determines whether a connection cancellation request message is received from the downstream node Nn connected to the node Nn of the CPU 304. In the case where the connection cancellation request message is received (YES in step S55), the CPU 304 advances to step S56. In the case where the connection cancellation request message is not received (NO in step S55), the CPU 304 advances to step S57.

In step S56, the CPU 304 deletes the node information of the downstream node Nn which has transmitted the connection cancellation request message from the node management table, and returns to step S4 of FIG. 8.

In step S57, on the basis of the reception quality information, for example, a determination is made as to whether stream relay quality (reception quality) becomes below a threshold. In the case where it is detected that the stream relay quality becomes below the threshold (YES in step S57), the CPU 304 advances to step S58. In the case where the stream relay quality is not below the threshold (NO in step S57), the CPU 304 advances to step S62.

In step S58, the CPU 304 transmits a stream stop request message to an upstream node Nn to which the node Nn of the CPU 304 is connected and, in step S59, transmits a connection cancellation request message to the upstream node Nn.

In step S60, the CPU 304 transmits a message reporting withdrawal from the topology of the node Nn of the CPU 304 to the connection destination introducing server 20.

In step S61, the CPU 304 generates an autonomous reconnection event and returns to step S4 of FIG. 8.

In step S62, a determination is made as to whether monitoring of the buffer memory is triggered. In the case where monitoring of the buffer memory is triggered (YES in step S62), the CPU 304 advances to step S63. In the case where monitoring of the buffer memory is not triggered (NO in step S62), the CPU 304 advances to step S66.

In step S63, a determination is made as to whether a dummy packet which passed its lifetime is detected.

According to a buffer memory monitoring program, the CPU 304 checks whether a dummy packet which passed its lifetime exists with reference to the buffer memory periodically (for example, at a frequency of once every 10 seconds).

For example, in the case where time after the elapse of the hold time (for example, 10 seconds) since the content packet loss detection time is written as the aging time of the dummy packet, a dummy packet which passed the written time is a dummy packet which passed its lifetime.

In the case where packet loss detection time and the hold time (for example, 10 seconds) are written as the aging time, time after the lapse of the hold time since the loss detection time written as the aging time is calculated by the CPU 304. A dummy packet which passed the calculated time is a dummy packet which passed its lifetime.

As described above, in the case of selecting the hold time at random in a predetermined range, time after a lapse of the selected hold time since the loss detection time written as the aging time is calculated by the CPU 304. A dummy packet which passed the calculated time is a dummy packet which passed its lifetime.

As described above, when the hold time is set to time according to a hierarchical level of a node Nn which receives a dummy packet, hold time according to the hierarchical level is calculated by the CPU 304. Further, time after the lapse of the calculated hold time since the loss detection time written as the aging time is calculated by the CPU 304. A dummy packet which passed the calculated time is a dummy packet which passed its lifetime.

The time for determining the lifetime may be calculated when monitoring of the buffer memory is triggered, or at an arbitrary timing after reception of the dummy packet (for example, on receipt of the dummy packet). In the case where the calculation is performed at an arbitrary timing after reception of the dummy packet, the calculated time is stored in the buffer memory in association with the sequence number of the dummy packet, and is referred to by the CPU 304 when monitoring of the buffer memory is triggered.

In the case where a dummy packet which passed its lifetime is detected (YES in step S63), the CPU 304 advances to step S64. In the case where a dummy packet which passed its lifetime is not detected (NO in step S63), the CPU 304 returns to step S4.

In step S64, the detected dummy packet is discarded.

In step S65, the CPU 304 transmits the packet complement request message to an upstream node Nn to which the node Nn of the CPU 304 is connected, and returns to step S4.

In step S66, the CPU 304 determines whether the packet complement request message is received from a downstream node Nn connected to the node Nn of the CPU 304. In the case where the packet complement request message is received (YES in step S66), the CPU 304 advances to step S67. In the case where the packet complement request message is not received (NO in step S66), the CPU 304 advances to step S71.

In step S67, a content packet corresponding to the packet complement request is retrieved from the buffer memory. In step S68, a determination is made as to whether the content packet is found. In the case where the content packet is found (YES in step S68), the CPU 304 transmits the content packet as a complementary packet to the downstream node Nn connected to the broadcast station 10 (step S69), and returns to step S4 of FIG. 8. On the other hand, in the case where the content packet is not found (NO in step S68), the CPU 304 transmits the packet complement request message to the upstream node Nn connected to the node Nn of the CPU 304 (step S70), and returns to step S4 of FIG. 8.

In step S71, a determination is made as to whether a withdrawal request from the user is received via, for example, the user input remote controller 310. In the case where the withdrawal request is received from the user (YES in step S71), the CPU 304 advances to step S72. In the case where there is no withdrawal request from the user (NO in step S71), the CPU 304 returns to step S4.

In step S72, the CPU 304 transmits a stream stop request message to an upstream node Nn to which the node Nn of the CPU 304 is connected and, in step S73, transmits a connection cancellation request message to the upstream node Nn. In such a manner, the node Nn of the CPU 304 is withdrawn from the tree topology.

In step S74, the CPU 304 transmits a withdrawal report message from the topology of the node Nn of the CPU 304 to the connection destination introducing server 20, and returns to step S4 of FIG. 8.

(Process of Broadcast Station 10)

The process of the CPU 104 in the broadcast station 10 will now be described with reference to FIG. 12.

Figure 12:
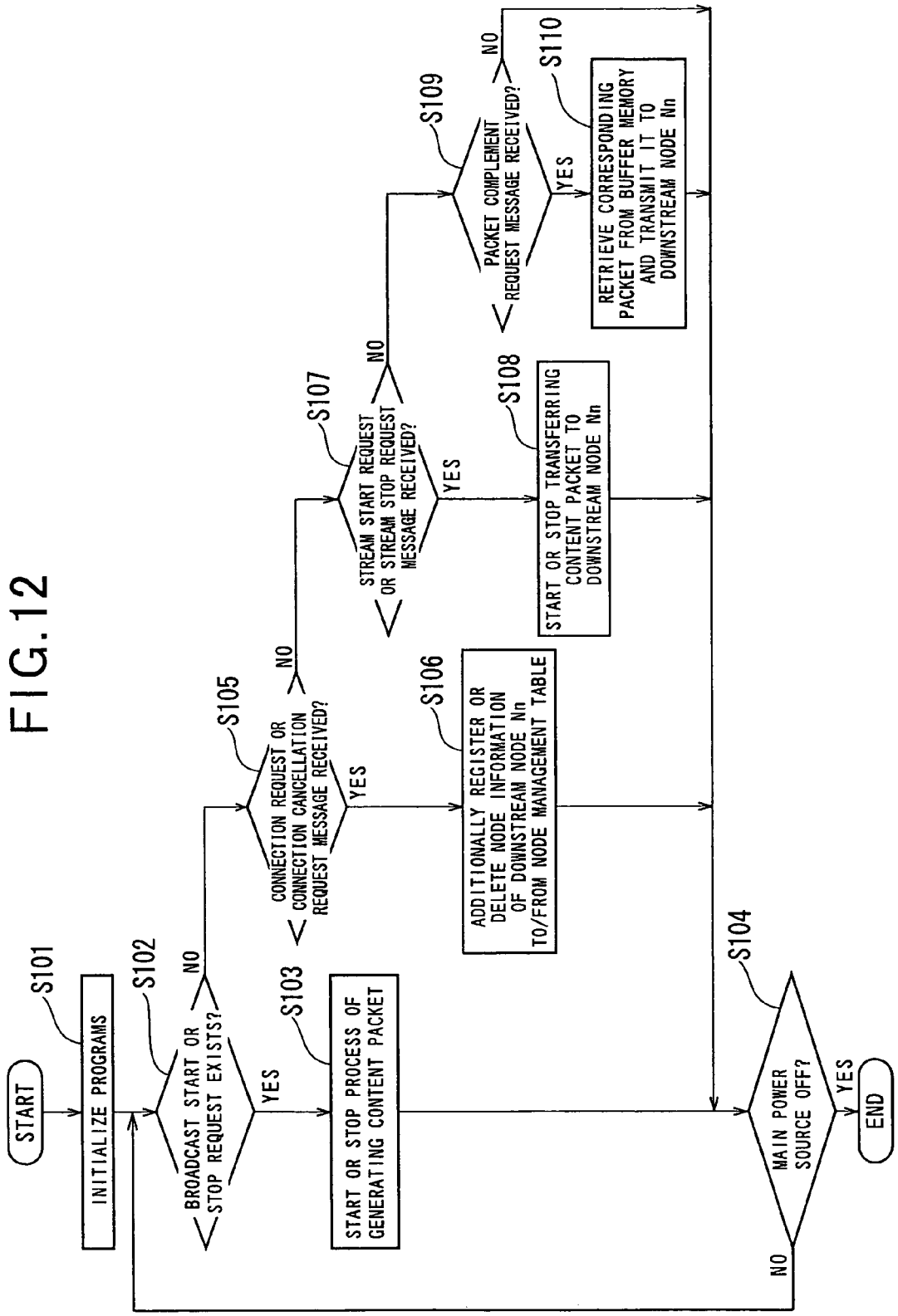
FIG. 12 is a flowchart showing processes executed by a CPU in the broadcast station.

The process of FIG. 12 is started when the broadcast station 10 is started by turn-on of the main power source 101. When the process is started, in step S101, various programs in the broadcast station 10 are initialized.

In step S102, a determination is made as to whether a broadcast start or stop request is received from a broadcast operator. In the case where the broadcast start or stop request is received (YES in step S102), the CPU 104 advances to step S103. In the case where the broadcast start or stop request is not received (NO in step S102), the CPU 104 advances to step S105.

In step S103, according to the broadcast start or stop request, a content packet generating process is started or stopped.

When the content packet generating process starts, a read access is made on content data recorded in the hard disk drive 103. Synchronously with a system timer, a content packet is generated and stored into the buffer memory. On the other hand, when the content packet generating process is stopped, the read access to the content data recorded in the hard disk drive 103 is stopped, and the buffer memory is cleared.

In step S104, a determination is made as to whether the main power source 101 of the broadcast station 10 is turned off. In the case where the main power source 101 is turned off (YES in step S104), the various programs are finished, and the process is finished. On the other hand, in the case where the main power source 101 is not off (NO in step S104), the CPU 104 returns to step S102.

In step S105, a determination is made as to whether a connection request or connection cancellation request message is received from the downstream node Nn connected to the broadcast station 10 is received. In the case where the connection request or connection cancellation request message is received (YES in step S105), the CPU 104 advances to step S106. In the case where the connection request or connection cancellation request message is not received (NO in step S105), the CPU 104 advances to step S107.

In step S106, the node information of the downstream node Nn is additionally registered in the node management table, or the node information is deleted from the node management table.

In step S107, a determination is made as to whether a stream start request or stream stop request message is received from the downstream node Nn connected to the broadcast station 10. In the case where the stream start request or stream stop request message is received (YES in step S107), the CPU 104 advances to step S108. In the case where the stream start request or stream stop request message is not received (NO in step S107), the CPU 104 advances to step S109.

In step S108, transfer of a content packet to the downstream node Nn is started or stopped, and the CPU 104 returns to step 104.

In step S109, a determination is made as to whether a packet complement request message is received from the downstream node Nn connected to the broadcast station 10. In the case where the packet complement request message is received (YES in step S109), the CPU 104 retrieves a content packet corresponding to the packet complement request from the buffer memory, transmits the content packet as a complementary packet to the downstream node Nn connected to the broadcast station 10 (step S110), and returns to step S104. On the other hand, in the case where the packet complement request message is not received (NO in step S109), the CPU 104 returns to step S104.

(Process of Connection Destination Introducing Server 20)

Figure 13:
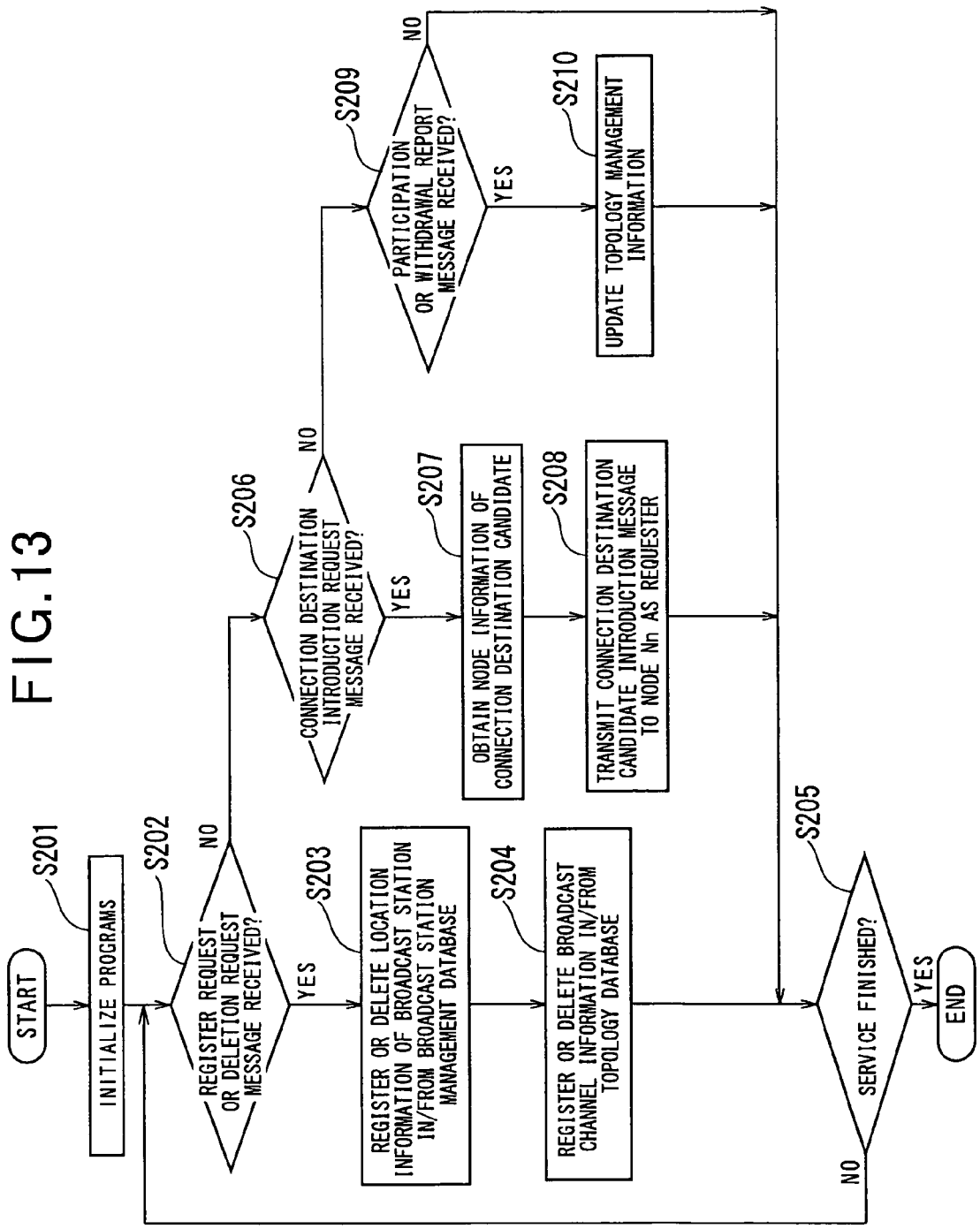
FIG. 13 is a flowchart showing processes executed by a CPU in the connection destination introducing server.

With reference to FIG. 13, a process in the CPU 204 in the connection destination introducing server 20 will be described.

The process of FIG. 13 is started when the connection destination introducing server 20 is started by turn-on of the main power source 201. When the process is started, in step S201, various programs in the connection destination introducing server 20 are initialized.

In step S202, a determination is made as to whether a registration request or deletion request message is received from the broadcast station 10. In the case where the registration request or deletion request message is received (YES in step S202), the CPU 204 advances to step S203. In the case where the registration request or deletion request message is not received (NO in step S202), the CPU 204 advances to step S206.

In step S203, location information included in the registration request message is registered in a broadcast station management database so as to be associated with broadcast channel information. Alternatively, information included in the deletion request message is deleted from the broadcast station management database.

In step S204, broadcast channel information corresponding to the broadcast station 10 in which the location information is registered is registered in a topology database, or is deleted from the topology database.

In step S205, a determination is made as to whether a connection destination introducing service is finished. In the case where the connection destination introducing service is finished (YES in step S205), the process is finished. In the case where the connection destination introducing service is not finished (NO in step S205), the CPU 204 returns to step S202.

In step S206, a determination is made as to whether a connection destination introducing request message is received from the node Nn. In the case where the connection destination introducing request message is received (YES in step S206), the CPU 204 advances to step S207. In the case where the connection destination introducing request message is not received (NO in step S206), the CPU 204 advances to step S209.

In step S207, one or more connection destination candidates are retrieved from the topology management information in the topology database, and node information of the connection destination candidates retrieved is obtained.

In step S208, the CPU 204 sends back a connection destination candidate introducing message including node information of the obtained connection destination candidates to the node Nn as the sender of the connection destination introduction request message, and returns to step S205.

In step S209, a determination is made as to whether a topology participation report or withdrawal report message is received from the node Nn. In the case where the topology participation report or withdrawal report message is received (YES in step S209), the CPU 204 advances to step S210. In the case where the topology participation report or withdrawal report message is not received (NO in step S209), the CPU 204 returns to step S205.

In step S210, topology management information registered in the topology database is updated in accordance with the topology participation report or withdrawal report message, and the CPU 204 returns to step S205. By the operation, fluctuations in the topology are reflected.

As described above, in the foregoing embodiment, a node Nn which first detects loss of a content packet, broadcasted from the broadcast station 10, sends a packet complement request for complementing a lost packet to the broadcast station 10 or an upstream node Nn, and makes a dummy packet for suppressing chain detection of the packet loss propagate in the downstream side (for example, to a node Nn in the lowest hierarchical level). On the other hand, a node Nn which receives the dummy packet holds to send the packet complement request to an upstream node Nn until the lifetime (hold time) of the dummy packet passes. Therefore, chain transmission of the packet complement request due to propagation of the packet loss event in the downstream direction is avoided, excessive traffic in a network can be prevented, and concentration of packet complement requests to a specific node Nn can be avoided.

A node Nn which receives the dummy packet determines the hold time elapsed before the packet complement request is transmitted at random in a predetermined range or in accordance with the hierarchical level of the node Nn. This configuration can prevent synchronization of timeouts of the hold times, reducing transmission of packet complement requests among the nodes in a concentrated short time.

The present invention is not confined to the configuration listed in the foregoing embodiments, but it is easily understood that the person skilled in the art can modify such configurations into various other modes, within the scope of the present invention described in the claims.

The invention claimed is:

1. A node device for use in a tree-shaped broadcasting system including a plurality of node devices connected and located in a hierarchy, the node device comprising:

a receiver configured to receive a plurality of packets of content data transmitted from a node located at one level higher in the hierarchy or a broadcasting device located at a top of the hierarchy;

a lost packet detector configured to detect a lost packet from the packets of the content data received by the receiver;

a packet complement request information transmitter configured to transmit packet complement request information to the node device located at one level higher in the hierarchy, the packet complement request information including a packet complementation request to complement the lost packet; and a dummy packet transmitter configured to transmit a dummy packet to a node located at one level lower in the hierarchy instead of the lost packet, the dummy packet including information to delay transmission of the packet complement request information for a predetermined period of hold time.

2. The node device according to claim 1, further comprising a complementary packet transmitter configured to transmit a packet corresponding to the packet complement request information to the node device located at one level lower in the hierarchy when the receiver receives the packet corresponding to the packet complement request information from the node located at one level higher in the hierarchy after the packet complement request information transmitter transmits the packet complement request information to the node device located at one level higher in the hierarchy.

3. The node device according to claim 2 further comprising:

a dummy packet receiver configured to receive a dummy packet; and a packet complement request information transmitter configured to wait until the hold time elapses when the dummy packet receiver receives a dummy packet transmitted from the node device located at one level higher in the hierarchy and transmit the packet complement request information indicative of a packet complement request for complementing the lost packet corresponding to the dummy packet to the node device located at one level higher in the hierarchy.

4. The node device according to claim 3, further comprising:

a hold time selector configured to randomly select a time period, as the hold time, within a predetermined hold time range when the dummy packet receiver receives the dummy packet, wherein the packet complement request information transmitter transmits the packet complement request information corresponding to the dummy packet to the node device located at one level higher in the hierarchy after a lapse of the time period selected by the hold time selector.

5. The node device according to claim 3, further comprising:

a hold time calculator configured to calculate the hold time according to a hierarchical level of a node device that receives the dummy packet when the dummy packet receiver receives the dummy packet, wherein the packet complement request information transmitter transmits the packet complement request information corresponding to the dummy packet to the node device located at one level higher in the hierarchy after a lapse of the hold time calculated by the hold time calculator.

6. A Non-transitory computer readable medium having computer executable instructions for performing a method of controlling a node device for use in a tree-shaped broadcasting system including a plurality of node devices connected and located in a hierarchy, the method comprising the steps of:

receiving a plurality of packets of content data transmitted from a node device located at one level higher in the hierarchy or a broadcasting device located at a top of the hierarchy;

detecting a lost packet from the packets of the content data received;

transmitting packet complement request information including a packet complementation request to complement the lost packet to the node device located at one level higher in the hierarchy; and transmitting a dummy packet to a node located at one level lower in the hierarchy instead of the lost packet.

7. A method of controlling a node device for use in a tree-shaped broadcasting system including a plurality of node devices connected and located in a hierarchy, the method comprising the steps of:

receiving a plurality of packets of content data transmitted from a node device located at one level higher in the hierarchy or a broadcasting device located at a top of the hierarchy;

detecting a lost packet from the packets of the content data received;

transmitting packet complement request information including a packet complementation request to complement the lost packet to the node device located at one level higher in the hierarchy; and transmitting a dummy packet to a node located at one level lower in the hierarchy instead of the lost packet.

* * * * *